J. P. FILLINGHAM.
CHAIN GEAR CASING.
APPLICATION FILED JAN. 22, 1910.

966,391.

Patented Aug. 2, 1910.

2 SHEETS—SHEET 1.

Witnesses
O. B. Baenziger,
Lotta Lee Bray.

Joseph P. Fillingham, Inventor

By Parker & Burton
Attorneys

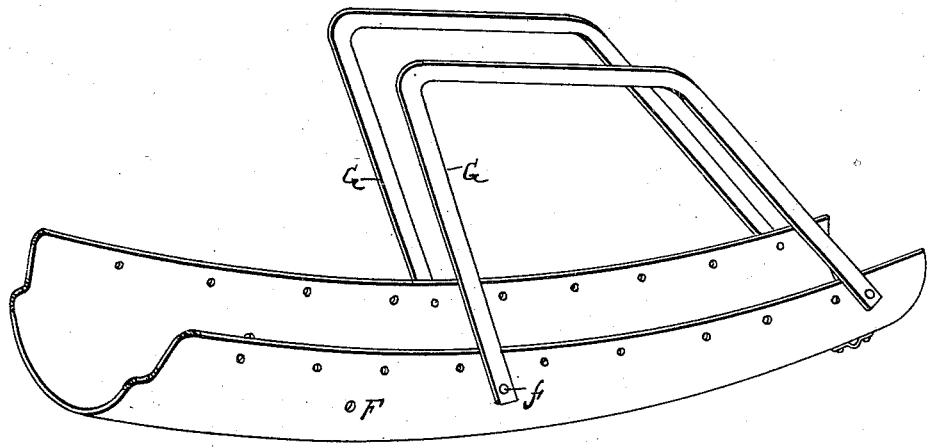
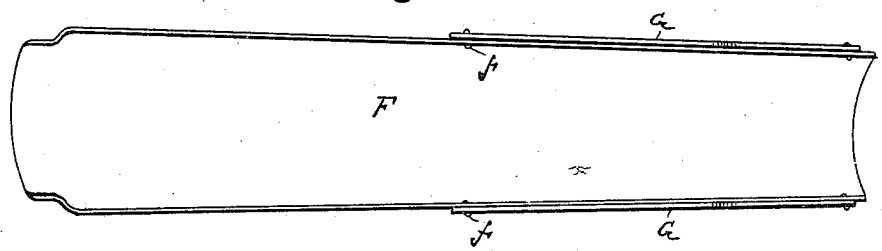
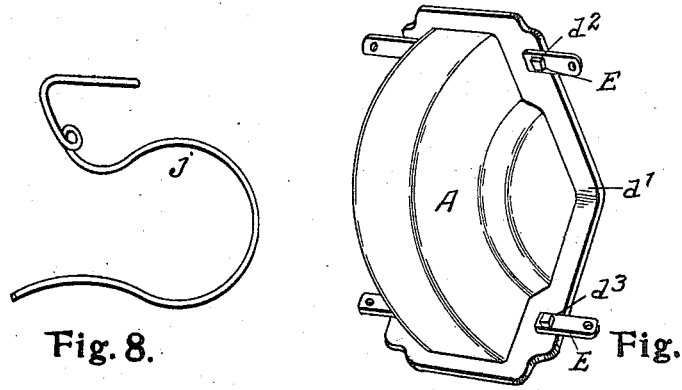

UNITED STATES PATENT OFFICE.

JOSEPH P. FILLINGHAM, OF LANSING, MICHIGAN, ASSIGNOR TO REO MOTOR CAR COMPANY, OF LANSING, MICHIGAN.

CHAIN-GEAR CASING.

966,391.  Specification of Letters Patent.  Patented Aug. 2, 1910.

Application filed January 22, 1910. Serial No. 539,493.

*To all whom it may concern:*

Be it known that I, JOSEPH P. FILLINGHAM, a citizen of the United States, residing at Lansing, county of Ingham, State of Michigan, have invented a certain new and useful Improvement in Chain-Gear Casings, and declare the following to be a full, clear, and exact description of the same, such as will enable others skilled in the art to which it pertains to make and use the same, reference being had to the accompanying drawings, which form a part of this specification.

My invention relates to a casing for the exposed parts of the driving gear of chain driven motor vehicles where the chain extends from the motor to a rear sprocket wheel; its object is to provide an efficient casing which may be practically applied to such forms of transmission mechanism known as chain drives, and it is set forth in the following description and specified in the claims thereto.

Figure 1:
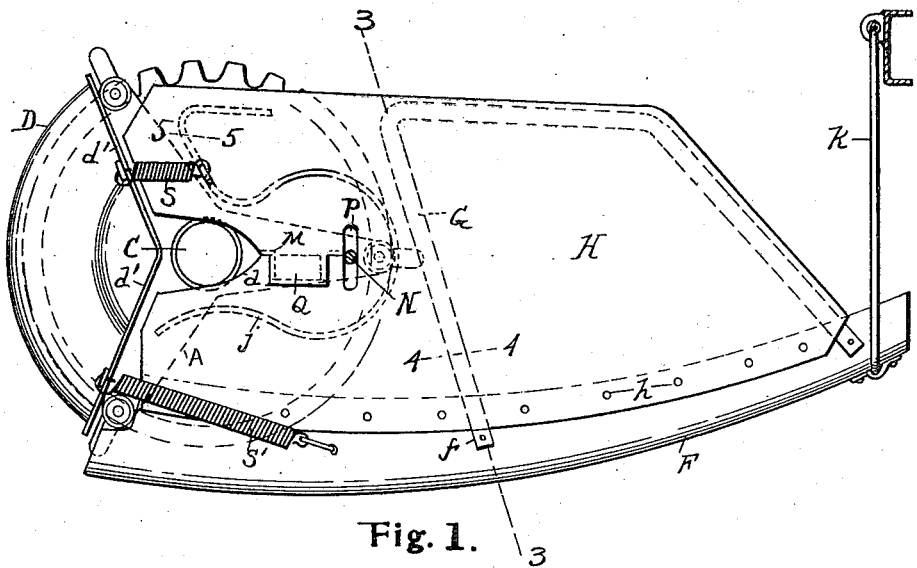
Figure 2:
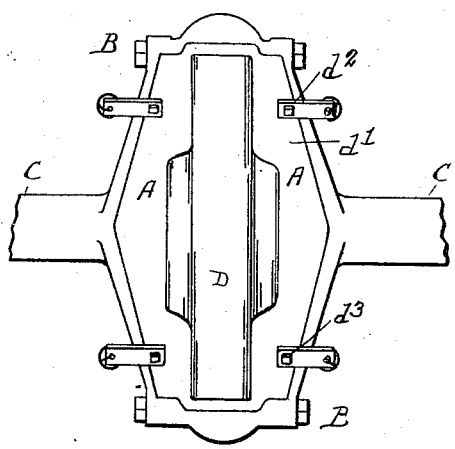
Figure 3:
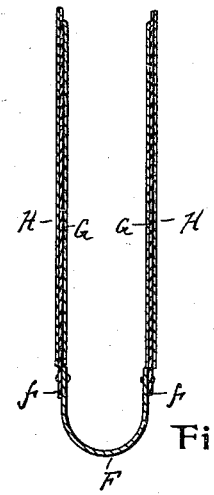
Figures 4, 5:
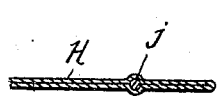

In the drawings: Figure 1, represents a side elevation of said casing and such parts of a motor vehicle as is necessary to illustrate its application thereto. Fig. 2, is a rear view showing the rear axle cut away, with spider and inclosing shield for protecting the rear of the sprocket in conjunction with said casing. Fig. 3, is a cross section on the line 3—3 of Fig. 1. Fig. 4, is a substantially horizontal cross section of the metal frame on the line 4—4 Fig. 1. Fig. 5, is a cross section on the line 5—5, Fig. 1. Fig. 6, shows the metallic parts of the framing for supporting the, preferably leather, side walls of said gear casing. Fig. 7, is a top view of Fig. 6. Fig. 8, is a detail of a metallic stiffening curved elastic rod inserted in the side walls of said casing. Fig. 9, is a perspective view of the concave shield showing its form.

Similar letters refer to similar parts.

In the drawings A A represents the spider usual in such constructions, partially shown in Fig. 1 in dotted lines.

B B are the bolts and struts uniting the extremities of the spiders, each of which preferably consists of three arms and as these spiders are rigidly connected to the dead axles, are common in the art and as there is nothing distinctive about them it is unnecessary to describe them in detail.

C is a cross section of the live axle, Fig. 1. This live axle is usually and preferably entirely inclosed in the dead axle, which consists of hollow tubes connected to the spider, but which in the drawing, Fig. 2, has been shown broken away therefrom.

D is a curved concave shield having flanges $d$, $d^1$, on its forward edge, which flanges are at a corresponding angle to each other, adapting the shield to fit the angle of the arms of the spider and also to fit the spider so that when the shield is bolted thereto by bolts $d^2$, $d^3$, it is held in so close proximity thereto as to be substantially dust-tight. The sides of the shield D are similarly flanged, this feature being clearly illustrated in the perspective view, Fig. 9, as to one side, and the other side corresponds therewith. The bolts $d^2$, $d^3$ also carry brackets E E, the outer ends of which are adapted to receive spiral springs S $S^1$, as shown in Fig. 1. These springs serve to hold the chain case closely up against its rear supports and the shield so as to make substantially dust-tight connection between the two and yet prevent such connection being rigid.

The shield proper consists of a curved trough F, Fig. 6, which constitutes its bottom; upon each flanged side of this trough F is rigidly fastened two metal bars G, G, which are peculiarly shaped as shown in Fig. 6. The point of attachment of one end of these bars at $f$ is substantially near the longitudinal center of the trough, while the other end is attached at the forward portion thereof. To each of these bars and trough is attached side walls H; these side walls are not shown in Fig. 6, but are shown in Fig. 1, and in cross section in Fig. 3. The lower edges of the walls H, which may be of leather or of any equivalent material, are riveted by the rivets shown in Fig. 1, at $h$, $h$, to the trough F, and are also attached in any convenient manner to each of the angular bars G. The bar may be embedded in a double thickness of the leather or it may be riveted thereto; the manner of attachment being immaterial so long as the bars support vertically the side walls H, and stiffen them thereby preventing their collapsing down on the chain. In the rear portion behind the bars G are two peculiarly curved metal rods J, shown in dotted lines in Fig. 1 and separately in Fig. 8. These are also embedded in the side walls H, as shown in the small cross section Fig. 5, on line 5—5 Fig. 1. These curved bars possess considerable elasticity and therefore while they each stiffen and support the respective side walls H, adjacent to the supporting axle, have a peculiar relation thereto as shown in the figures. They do so with considerable capacity for yielding and thus assist or rather permit extensive yielding of those side walls at that point due to the oscillations of the body to which the front end of the chain case is attached (by link K, Fig. 1), relatively to the axle C, due to the action of the springs in the ordinary service of the car to which the chain boot is attached. Each of the side walls is cut away longitudinally in the rear center as shown in Fig. 1, at L, so as to permit their being drawn over the axle C, rearwardly; thus they inclose the forward arm of the spider and in order to permit, if necessary, a strut rod to pass through said forward arm and angularly back to each end of the axle, a longitudinal cut is made in the side walls H, on the dotted line M, Fig. 1, which cut extends forward to the strut rod N, and to a vertical opening P made in the side wall whereby the wall H can be allowed to play upward and downward on the strut rod without cramping the side wall. Over the cut M is a depending flap Q, which being attached to the upper part of the side wall above the opening M, closes off this opening when in use and renders it substantially dust-proof.

The operation of this device is sufficiently obvious from the description thereof.

Having thus described my invention, what I desire to claim as new is:

1. In a gear casing, the combination of a curved trough, flexible side walls attached thereto, appropriately shaped supporting side bars, the rear portion of said flexible side walls each being divided longitudinally into an upper and lower part adapted to inclose the rear gearing and embracing the axle and strut rods of the vehicle, an elastic metal stiffener for said upper and lower parts, substantially as described.

2. The combination, with a supporting axle, of a spider, a curved inclosing case, a flexibly supported curved trough, stiffening side bars attached to said trough, side wall pieces attached to said trough and to said side bars, the rear portion of said wall pieces being divided to engage about said axle, and resilient stiffening rods for those portions of the side wall pieces adjacent said axle, substantially as described.

In testimony whereof, I sign this specification in the presence of two witnesses.

JOSEPH P. FILLINGHAM.

Witnesses:
 DEAN M. PARSONS,
 GEORGE E. SMITH.